United States Patent
Burri et al.

(12)

(10) Patent No.: US 6,607,760 B2
(45) Date of Patent: Aug. 19, 2003

(54) CEREAL BAR AND METHOD OF MAKING

(75) Inventors: Joseph Burri, Epalinges (CH); Martine Daenzer-Alloncle, Treycovagnes (CH); Jean-Jacques Desjardins, Yens (CH); Sylke Neidlinger, Lausanne (CH)

(73) Assignee: Nestec S.A., Vevey (CH)

( * ) Notice: Subject to any disclaimer, the term of this patent is extended or adjusted under 35 U.S.C. 154(b) by 104 days.

(21) Appl. No.: 09/961,197

(22) Filed: Sep. 20, 2001

(65) Prior Publication Data

US 2002/0058089 A1 May 16, 2002

Related U.S. Application Data

(63) Continuation of application No. PCT/EP00/01754, filed on Mar. 2, 2000.

(30) Foreign Application Priority Data

Mar. 24, 1999 (EP) .............................. 99200914

(51) Int. Cl.⁷ .......................... A23L 1/164; A23L 1/304
(52) U.S. Cl. .......................... 426/74; 426/453; 426/516; 426/549; 426/580; 426/618

(58) Field of Search .......................... 426/74, 549, 453, 426/516, 618, 580

(56) References Cited

U.S. PATENT DOCUMENTS

| 2,437,150 A | 3/1948 | Berg |
| 3,903,308 A | 9/1975 | Ode .............................. 426/93 |
| 4,650,685 A | 3/1987 | Persson et al. .............. 426/285 |

FOREIGN PATENT DOCUMENTS

| EP | 0 431 201 | 12/1989 | ............ A23L/1/164 |
| EP | 0 908 106 | 10/1997 | .............. A23L/1/18 |

*Primary Examiner*—Helen Pratt
(74) *Attorney, Agent, or Firm*—Winston & Strawn

(57) ABSTRACT

A ready-to-eat, nutritionally valuable food bar containing an extruded mixture of (a) agglomerated particles or flakes of at least one cooked-extruded base made of amylaceous materials and milk solids and (b) a binder made of sugar, milk solids and a binding agent, wherein the extruded mixture has the shape of a bar. Also, a process for manufacturing a ready-to-eat food bar by preparing a dry mixture of particles or flakes of at least one cooked-extruded base containing amylaceous materials and milk solids; mixing the dry mixture with a binder made of sugar, milk solids and a binding agent; and forming the mass obtained into a bar shape.

22 Claims, No Drawings

CEREAL BAR AND METHOD OF MAKING

CROSS-REFERENCE TO RELATED APPLICATIONS

This application is a continuation of the U.S. national stage designation of International application PCT/EP00/01754 filed Mar. 2, 2000, the content of which is expressly incorporated herein by reference thereto.

BACKGROUND OF THE INVENTION

Cereal bars are generally known in the art as exemplified by the following publications:

U.S. Pat. No. 4,650,685 to Persson et al. discloses a biscuit comprising agglomerated granules of a cooked-extruded base coated with a binder, the base comprising about 40 to 80 parts by weight of cereal flour, up to 20 parts sucrose and about 0.5 to 3 parts of oil or fat, and the binder comprising about 8 to 30 parts by weight of sucrose and/or mixtures of glucose and its polymers.

WO89/04121 (HEINZ SCHAAF OHG) discloses a process for manufacturing cereals by cooking-extruding a mixture of cereal material, vegetable and/or fruits with a partial amount of sugar and milk, cutting the expanded rope of cooked-extruded mixture into pieces having a large surface, spraying an aqueous suspension of sugar and milk onto the just cut, hot and moist pieces, coating the moistened pieces with a remaining part of components in powder form and drying the coated pieces.

Despite the existence of these publications, there still remains a need for improvements in such products, and the present invention satisfies this need.

SUMMARY OF THE INVENTION

The present invention provides a ready-to-eat cereal bar comprising amylaceous material, sugar and milk solids, which is nutritionally valuable and may represent a complete meal just as it is. The present invention also provides a process for manufacturing such a ready-to-eat food bar.

The ready-to-eat food bar consists of agglomerated particles and/or flakes of one or more cooked-extruded bases mainly comprising amylaceous materials and milk solids which are coated with a binder mainly comprising sugar, milk solids and a binding agent.

The process for manufacturing the ready-to-eat food bar consists of preparing a dry mixture of particles and/or flakes of one or more cooked-extruded bases mainly comprising amylaceous materials and milk solids, mixing the dry mixture with a binder mainly comprising sugar, milk solids and a binding agent, and forming the mass thus obtained into a bar shape.

The expression "nutritionally valuable" means a food bar which is rich in milk protein and calcium. Typically, such products are based on amylaceous materials and sugar and, in the present invention, especially comprise, in percent by weight, 5.5 to 27.5% of non-fat milk solids and about 2.5 to 12.5% of milk fat and/or vegetable fat.

As a whole, beside a few percent of each of residual water, ash, dietary fibers and binding agent, the present bar may generally comprise, in percent by weight, about 6 to 18% of protein, about 60 to 80% of available carbohydrate and about 2.5 to 15% of fat.

It has surprisingly been found that it was possible in this way to provide a food bar which is ready-to-eat just as it is, while being nutritionally valuable, comprising amylaceous materials, sugar, milk solids and calcium.

It has been found that it is better to incorporate the milk solids into the food bar in two parts, a first part being incorporated into the cooked-extruded bases and a second part being incorporated into the binder.

It has also been found that with a preferred high content of milk solids, more than 16% of whole milk solids, which means from more than about 11% non-fat milk solids and more than about 5% milk fat, it is still possible to obtain cooked-extruded-expanded bases which have a fine, porous, crunchy, smooth, melt-in-the mouth and texture which is not hard.

The food bar may comprise from 5.5 to 27.5%, and preferably more than 11 to 27.5% of non-fat milk solids, from 2.5 to 12.5%, and preferably more than 5 to 10% and more preferably more than 5 to 12.5% of milk fat and/or vegetable fat, from 30 to 60% of amylaceous material, from 5 to 30% of sugar, from 0.2 to 1.5% of binding agent and from 1 to 8%, and preferably from 1 to 4% of residual water.

In addition to the calcium already present in the milk solids, the food bar may further comprise up to 3% of additional calcium, preferably in the form of calcium carbonate. The food bar may also comprise added vitamins, oligoelements, sodium chloride and/or a source of dietary fibers.

The non-fat milk solids in the cooked-extruded bases may be powdered skimmed milk. The milk fat and/or vegetable fat in the cooked-extruded bases may be butter oil, vegetable oil or fat which may act as lubricating agent in the cooking-extruding process. The milk solids in the binder may be whole milk powder.

The amylaceous material may be cereal flour, a starch and/or maltodextrin, for example. The cereal flour may be wheat, barley, oat, rice and/or corn. The starch may be a native starch from wheat, barley, rice, tapioca, potato and/or corn, especially waxy corn. The sugar may be sucrose, dextrose and/or fructose. Beside sugar, milk solids and a binding agent, the binder may further comprise glycerin. The binding agent may be a polysaccharide or a gum such as gum-arabic, for example. The source of dietary fiber may be a cereal bran.

A preferred embodiment of the present ready-to-eat food bar consists of agglomerated particles and/or flakes of different bases mainly comprising different cereals beside milk solids, especially a cooked-extruded-expanded base mainly comprising rice flour, a cooked-extruded-expanded base mainly comprising wheat flour and wheat starch, and/or a cooked-extruded and flaked base mainly comprising corn flour and corn starch.

The present product has the shape of a bar, especially a bar having a rectangular, oval or circular cross section. Preferably, the food bar has a chewy texture.

DETAILED DESCRIPTION OF THE PREFERRED EMBODIMENTS

The process for manufacturing a ready-to-eat food bar consists of preparing a dry mixture of particles and/or flakes of one or more cooked-extruded bases mainly comprising amylaceous materials and milk solids, mixing the dry mixture with a binder mainly comprising sugar, milk solids and a binding agent, and forming the mass thus obtained into a bar shape.

Preparing Particles of a Cooked-extruded-expanded Base

Particles of a cooked-extruded-expanded base mainly comprising amylaceous materials and milk solids may be obtained by cooking-extruding-expanding at 120 to 1 70° C. under 40 to 160 bar for 5 to 50 s, a mixture comprising, in parts by weight, from 5.5 to 27.5 parts, preferably from more than 11 to 22 parts and more preferably from more than 11 to 27.5 parts of non-fat milk solids, from 2.5 to 12.5 parts, preferably from more than 5 to 10 parts and more preferably from more than 5 to 12.5 parts of milk fat and/or vegetable fat, from 50 to 80 parts of amylaceous material, up to 12 parts sugar, and added water up to a water content of from 11 to 19% by weight of the mixture, such a water content being adequate for obtaining a correct expansion after cooking-extruding the mixture, thus obtaining a rope of a thermoplastic mass having a porous texture, cutting the rope into pieces and optionally drying them down to a residual water content of from 1 to 4%.

The mixture may further comprise up to 3 parts of additional calcium, preferably in form of calcium carbonate, in addition to the calcium already present in the non-fat milk solids, for example. The mixture may also further comprise added vitamins, oligoelements and sodium chloride.

The mixture may be prepared by first mixing together powdery components to obtain a dry mix and then mixing together the dry mix and liquid or fluid components. This mixing step may be carried out in a first mixing section of a traditional food extruder, especially a twin screw extruder.

Cooking the mixture may then be carried out in subsequent sections of the extruder where the mixture is heated, compressed and sheared so that it forms a cooked thermoplastic mass. The thermoplastic mass may be extruded by having it pushed by the extruder screw or twin screw through the openings of a die provided for at an end of the extruder. The die may have one or more circular openings having of from 2 to 5 mm in diameter.

The thermoplastic mass may be expanded by extruding it through the die into an open space at ambient temperature and at atmospheric pressure.

Water is lost in the form of steam escaping the thermoplastic mass during expansion so that the rope thus obtained has a porous texture and may have a water content of from 5 to less than 11%.

Compressed nitrogen may be injected into the plasticized mass just before extruding it. Nitrogen injection may be carried out under a pressure of from about 35 to 160 bar, at a rate of from 0.1 to 0.6 g nitrogen per kg of mass, for example.

Most surprisingly, the cooked-extruded thermoplastic mass does not expand to a greater degree under the effect of nitrogen injection but on the contrary to a lesser degree. This is because the injected nitrogen not only increases the number of bubbles within the expanded rope of cooked-extruded thermoplastic mass but also cools down the mass before it is extruded. A fine porous texture may be obtained in this way which stands in contrast with a rather coarse porous texture which may be obtained without nitrogen injection.

Cutting into pieces the thus obtained rope of expanded thermoplastic mass may be carried out by a two or more blade cutter rotating adjacent to the die openings, for example. Drying the pieces, preferably down to a residual water content of from 1 to 4% by weight, may be carried out on a belt dryer with hot air.

Preparing Flakes of a Cooked-extruded Base

Flakes of a cooked-extruded base mainly comprising amylaceous materials and milk solids may be obtained in a way similar to the way disclosed above for particles of a cooked-extruded-expanded base except that the mixture to be cooked-extruded comprises added water up to a water content of from 20 to 30% (instead of from 11 to 19%) by weight of the mixture, such a water content being adequate for obtaining no or only little expansion after cooking-extruding the mixture.

Cutting into pieces the thus obtained rope of non or only slightly expanded thermoplastic mass may be carried out by a two or more blade cutter rotating adjacent to the die openings.

The pieces of cooked-extruded base thus obtained may then be flaked between a pair of rollers and dried down to a residual water content of from 1 to 4% by weight.

Preparing the Binder

The binder may be prepared by mixing together its components. An adequate binder may have a milk solids content which is lower, similar to or even more important than the milk solids content of the particles and/or flakes of cooked-extruded bases, but not higher than about 40% on dry matter.

The milk solids may be incorporated into the binder in form of fresh milk and/or milk powder. Water may be added as such or as water contained in fresh milk.

The binder may comprise, in parts by weight, from 10 to 70 parts of sugar, 0.5 to 5 parts of binding agent, up to 40 parts of whole milk solids, up to 15 parts of glycerin, up to 60 parts of fruit pulp or concentrate, up to 10 parts of cocoa powder and added water up to a water content of from 10 to 30%.

Mixing Particles and/or Flakes and Binder

A dry mix of particles and/or flakes is first prepared. Mixing the dry mix with the binder may be carried out by means of any adequate mixing apparatus such as a screw mixer of the helical spring type with an axial sprinkling nozzle or with a coating drum.

The dry mix and the binder may be mixed at a rate of about 40 to 70 parts by weight of dry mix and about 60 to 30 parts by weight of binder. A fat, especially an aromatic vegetable fat such as coconut fat may be added at this stage at a rate of from about 2.5 to 5 parts.

Shaping the Bar and Optionally Drying

The mass obtained by mixing particles and/or flakes with the binder may be formed into a bar shape by extrusion through a die having a rectangular, oval or circular opening or by molding. The ready-to-eat food bar thus obtained may then be dried down to a residual water content of 1 to 4%, on a belt dryer with hot air.

The ready-to-eat food bar may be conditioned in a packing providing for its protection against humidity, such as a packing made of a film with aluminum foil.

EXAMPLES

The following examples are given as illustration of embodiments of the ready-to-eat food bar and of the process for its manufacture according to the present invention. The parts and percentages are given by weight.

Example 1

For manufacturing a ready-to-eat food bar comprising particles and/or flakes of various cooked-extruded bases, rice particles, wheat particles and corn flakes were prepared as follows:

Particles of Cooked-extruded-expanded Rice Base

A mixture was prepared which had the following composition, (in parts, except added water):

| | |
|---|---|
| Rice flour | 80 |
| Crystal sugar | 4 |
| Skimmed milk powder | 5,5 |
| Sodium chloride | 1 |
| Calcium carbonate | 0.5 |
| Added water, up to a water content of | 18% |

For preparing the mixture, the powders were first mixed together to obtain a dry mix. The dry mix and added water were then mixed together in the extruder. The mixture obtained in this way was cooked-extruded-expanded with the aid of a BC-45H type CLEXTRAL twin screw extruder having a screw diameter of 55 mm and a total processing length of 800 mm.

Cooking-extruding was carried out at 130 C. under 80 bar for 30 s, the two intermeshing screws rotating at 300 rpm. The cooked thermoplastic mass obtained in this way was extruded through a die having eight circular openings 3 mm in diameter.

The thermoplastic mass was extruded into ambient air and immediately cut with a two blade cutter rotating adjacent to the opening at 2000 rpm.

The particles of cooked-extruded-expanded rice base obtained in this way expanded after cutting so that they were about 5 mm in diameter. They had a water content of 8.7%. The particles were then dried with hot air on a belt dryer to a residual water content of 3.4%.

Particles of Cooked-extruded-expanded Wheat Base

A mixture was prepared which had the following composition, (in parts, except added water):

| Wheat flour | 41 |
| Wheat starch | 18 |
| Skimmed milk powder | 10 |
| Oat flour | 9 |
| Wheat bran | 9 |
| Calcium carbonate | 0.5 |
| Added water, up to water content of | 19% |

For preparing the mixture, the powders were first mixed together to obtain a dry mix. The dry mix and added water were then mixed together in the extruder. The mixture obtained in this way was cooked-extruded-expanded with the aid of a BC-45H type CLEXTRAL twin screw extruder having a screw diameter of 55 mm and a total processing length of 800mm.

Cooking-extruding was carried out at 132° C. under 100 bar for 30 s, the two intermeshing screws rotating at 300 rpm. The cooked thermoplastic mass obtained in this way was extruded through a die having eight circular openings 3 mm in diameter.

The thermoplastic mass was extruded into ambient air and immediately cut with a two blade cutter rotating adjacent to the opening at 2000 rpm.

The particles of cooked-extruded-expanded wheat base obtained in this way expanded after cutting so that they were about 5 mm in diameter. They had a water content of 10.6%. The particles were then dried with hot air on a belt dryer to a residual water content of 2.9%.

Flakes of Cooked-extruded Corn Base

A mixture was prepared which had the following composition, (in parts, except added water):

| Corn semolina | 48 |
| Corn starch | 17 |
| Skimmed milk powder | 10 |
| Corn bran | 9 |
| Calcium carbonate | 0.5 |
| Added water, up to a water content of | 24% |

For preparing the mixture, the powders were first mixed together to obtain a dry mix. The dry mix and added water were then mixed together in the extruder. The mixture obtained in this way was cooked-extruded with the aid of a BC-45H type CLEXTRAL twin screw extruder having a screw diameter of 55 mm and a total processing length of 800 mm.

Cooking-extruding was carried out at 160° C. under 55 bar for 30s, the two intermeshing screws rotating at 300 rpm.

The cooked thermoplastic mass obtained in this way was extruded through a die having two circular openings or orifices 5 mm in diameter.

The thermoplastic mass was extruded into ambient air and immediately cut with a two blade cutter rotating adjacent to the opening at 1450 rpm. The particles of cooked-extruded corn base obtained in this way expanded only slightly after cutting. They had a water content of 11.5%. The particles were rolled to flakes having a thickness of about 0.75 mm. The flakes were then dried with hot air on a belt dryer to a residual water content of 1%.

Binder

A binder was prepared which had the following composition (parts):

| Fresh milk (2.8% fat) | 11.5 |
| Glycerin | 14 |
| Gum-arabic | 3 |
| Fructose | 66 |
| Calcium carbonate | 0.5 |

For preparing the binder, the components were mixed together in a double walled tank while being heated to about 50° C.

Ready-to-eat Food Bar

A dry mix was prepared by mixing together 15.6 parts of particles of cooked-extruded-expanded rice base, 15.6 parts of particles of cooked-extruded-expanded wheat base and 18 parts of flakes of cooked-extruded corn base.

This dry mix was mixed with 4 parts of coconut fat and 46.8 parts of binder by means of a mixer of the helical spring type.

The mass thus obtained was formed into a bar shape by extrusion through a die having a rectangular opening 3 cm in width and 1 cm in height and cut into individual bars 10 cm in length.

The bars had a chewy texture, an appetizing taste and could be eaten as they were. They were nutritionally valuable, each individual bar representing a complete meal just as it was.

Example 2

For manufacturing a ready-to-eat food bar comprising particles of a cooked-extruded-expanded corn and wheat base especially rich in milk protein and calcium, a mixture was prepared which had the following composition (in parts, except added water):

| Corn semolina | 49 |
| Wheat flour | 15 |
| Waxy corn starch | 10 |
| Crystal sugar | 12 |
| Skimmed milk powder | 8 |
| Butter oil | 6 |
| Added water, up to a content of | 12% |

For preparing the mixture, the powders were first mixed together to obtain a dry mix. The dry mix, oil, and added water were then mixed together in the extruder. The mixture obtained in this way was cooked-extruded-expanded with the obtained aid of a BC-45 type CLEXTRAL twin screw extruder having a screw diameter of 55 mm and a total processing length of 1200 mm.

Cooking-extruding was carried out at 153° C. under 50 bar for 30s, the two intermeshing screws rotating at 350 rpm.

The extruder was equipped with a die having eight circular openings 3 mm in diameter. Nitrogen was injected into the thermoplastic mass at a screw processing length of 1030 mm, under 37 bar and at a rate of 80 g/h.

The cooked thermoplastic mass thus obtained was extruded into ambient air and immediately cut with a two blade cutter rotating adjacent to the opening at 2000 rpm.

The particles of cooked-extruded-expanded corn and wheat base obtained in this way expanded after cutting so that they were about 5 mm in diameter. They had a water content of 7.5% and a fine, porous, crunchy, smooth and melt-in-the-mouth texture. The particles were then dried with hot air on a belt dryer to a residual water content of 2.9%.

A binder was prepared which had the following composition (parts):

| | |
|---|---|
| Fresh milk (2.8% fat) | 11.5 |
| Glycerin | 14 |
| Gum-arabic | 3 |
| Fructose | 66 |
| Calcium carbonate | 0.5 |

For preparing the binder, the components were mixed together in a double walled tank while being heated to about 50° C. Fifty parts of dried particles were mixed with 4 parts of coconut fat and 46 parts of binder by means of a mixer of the helical spring type.

The mass thus obtained was formed into a bar shape by extrusion through a die having an oval opening 3 cm in width and 1 cm in height and cut into individual bars 10 cm in length. The bars had a chewy texture, an appetizing taste and could be eaten as they were. They were nutritionally valuable and especially rich in milk protein and calcium. Each individual bar represented a complete meal just as it was.

What is claimed is:

1. A ready-to-eat, nutritionally valuable food bar comprising an extruded mixture of (a) agglomerated particles or flakes of at least one cooked-extruded base comprising amylaceous materials and milk solids and (b) a binder comprising sugar, milk solids and a binding agent, wherein the extruded mixture has the shape of a bar.

2. The food bar of claim 1, which contains, in percent by weight, about 6 to 18% of protein, about 60 to 80% of carbohydrate and about 2.5 to 15% of fat.

3. The food bar of claim 1, which contains, in percent by weight, about 5.5 to 27.5% of non-fat milk solids, about 2.5 to 12.5% of milk fat or vegetable fat or a combination thereof, about 30 to 60% of amylaceous material, about 5 to 30% of sugar, about 0.2 to 1.5% of binding agent and about 1 to 8% of residual water.

4. The food bar of claim 1, which contains, in percent by weight, about 11 to 27.5% of non-fat milk solids, about 5 to 12.5% of milk fat or vegetable fat or a combination thereof, about 30 to 60% of amylaceous material, about 5 to 30% of sugar, about 0.2 to 1.5% of binding agent and about 1 to 8% of residual water.

5. The food bar of claim 1, further comprising added calcium in an amount sufficient to increase the calcium content of the bar but to no more than 3%.

6. The food bar of claim 5, wherein the added calcium is calcium carbonate.

7. The food bar of claim 1, wherein the sugar is sucrose, dextrose, fructose, or combinations thereof, and further comprising one of vitamins, oligoelements, sodium chloride, sources of dietary fibers, or combinations thereof.

8. The food bar of claim 7, wherein the source of dietary fiber is cereal bran.

9. The food bar of claim 1, wherein the amylaceous material is cereal flour, starch or maltodextrin or combinations thereof, and the milk solids are obtained from whole milk powder, milk fat, or skimmed milk.

10. The food bar of claim 1 wherein the binding agent is a polysaccharide or a gum.

11. The food bar of claim 10 wherein the binding agent further comprises glycerin.

12. The food bar of claim 1 having a rectangular, oval or circular cross section and a chewy texture.

13. A process for manufacturing a ready-to-eat food bar which comprises the steps of:

preparing a dry mixture of particles or flakes of at least one cooked-extruded base comprising amylaceous materials and milk solids;

mixing the dry mixture with a binder comprising sugar, milk solids and a binding agent; and forming the mass obtained into a bar shape.

14. The process of claim 13, wherein the amylaceous material is cereal flour, starch or maltodextrin or combinations thereof.

15. The process of claim 14 wherein the starch is a native starch from wheat, barley, rice, tapioca, potato, or corn, or combinations thereof.

16. The process of claim 13, wherein the milk solids of the cooked-extruded base is powdered skimmed milk.

17. The process of claim 13, wherein the milk solids of the cooked-extruded base is milk fat or vegetable fat.

18. The process of claim 13 wherein the binding agent is a polysaccharide or a gum.

19. The process of claim 18 wherein the binder further comprises glycerin.

20. The process of claim 13 wherein the milk solids of the binder is whole milk powder.

21. The process of claim 13 wherein the sugar is sucrose, dextrose, fructose, or combinations thereof.

22. The process of claim 13 wherein the bar is produced having a rectangular, oval or circular cross section and a chewy texture.

* * * * *

UNITED STATES PATENT AND TRADEMARK OFFICE
CERTIFICATE OF CORRECTION

PATENT NO.     : 6,607,760 B2
DATED          : August 19, 2003
INVENTOR(S)    : Burri et al.

It is certified that error appears in the above-identified patent and that said Letters Patent is hereby corrected as shown below:

<u>Title page,</u>
Item [30], Foreign Application Priority Data, after "Mar. 24, 1999 (EP) 99200914", insert -- Apr. 13, 1999 (EP) .................. 99201125 --.

<u>Column 8,</u>
Line 43, delete "or vegetable fat".

Signed and Sealed this

Thirtieth Day of December, 2003

JAMES E. ROGAN
*Director of the United States Patent and Trademark Office*